(12) United States Patent
Neag et al.

(10) Patent No.: US 6,536,069 B1
(45) Date of Patent: Mar. 25, 2003

(54) WIPER SYSTEM MECHANISM

(75) Inventors: Dorinel Neag, Walled Lake, MI (US); Daniel W Husted, Saline, MI (US); Brian J Rahn, St. Clair Shores, MI (US); Joseph E Rudelic, Canton, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/970,420

(22) Filed: Oct. 3, 2001

(51) Int. Cl.[7] .............................. B60S 1/24; B60S 1/28
(52) U.S. Cl. .............................. 15/250.14; 15/250.27; 15/250.3; 74/42; 74/25
(58) Field of Search ................ 15/250.14, 250.27, 15/250.3, 250.31; 74/42, 43, 25

(56) References Cited

U.S. PATENT DOCUMENTS

| | | | | |
|---|---|---|---|---|
| 2,232,480 A | * | 2/1941 | Schmid | 15/250.14 |
| 2,608,707 A | * | 9/1952 | Oishei | 15/250.27 |
| 2,768,530 A | * | 10/1956 | Brundage | 15/250.14 |
| 2,894,774 A | * | 7/1959 | Dudash | 15/250.27 |
| 3,144,672 A | * | 8/1964 | Fehrenbach | 15/250.14 |
| 3,733,913 A | * | 5/1973 | Schneider et al. | 15/250.27 |
| 4,969,227 A | * | 11/1990 | Reed et al. | 15/250.14 |
| 5,381,582 A | | 1/1995 | Lee et al. | |
| 5,408,719 A | | 4/1995 | DeRees et al. | |
| 5,504,966 A | | 4/1996 | Lee et al. | |
| 6,027,157 A | | 2/2000 | Epple | |

FOREIGN PATENT DOCUMENTS

| | | | | |
|---|---|---|---|---|
| BE | 499755 | * | 3/1951 | 15/250.27 |
| FR | 2667833 | * | 4/1992 | 15/250.27 |

* cited by examiner

Primary Examiner—Gary K. Graham
(74) Attorney, Agent, or Firm—Donald J. Wallace

(57) ABSTRACT

A vehicle wiper system is provided including a cross-vehicle shaft that drives a pair of actuation mechanisms for driving a pair of wiper assemblies. The actuation mechanisms each include a crank, a connecting rod and a lever arm, whereby the connecting rod operably interconnects the crank and lever arm. The lever arm is fixed for rotation with a wiper post, which is in turn fixed to the wiper assembly. The actuation mechanism drives reciprocal rotation of the wiper post, thereby driving reciprocal sweeping motion of the wiper assemblies. The cross-vehicle shaft is driven by a motor that is controlled by a controller.

2 Claims, 4 Drawing Sheets

WIPER SYSTEM MECHANISM

FIELD OF THE INVENTION

The present invention relates to vehicle wiper systems and more particularly to a vehicle wiper system for shallow sloping windshields.

BACKGROUND OF THE INVENTION

Automobile design is a significant component of a manufacturer's competitive advantage over other manufacturers in the market. Thus, manufacturers continuously strive to design more appealing products to set themselves apart in the market, boosting consumer interest and sales. To achieve certain cosmetic and functional design goals, internal systems of a vehicle may require modification or redesign in order to properly package within the vehicle.

Conventional windshield wiper systems include a plurality of links for enabling reciprocal operation of a set of wiper blades. In general, conventional windshield wiper systems include a main support arm that is attachable to the vehicle. A motor and gearbox are supported by the main support arm, attached to an over-sized bracket. For each wiper arm, a first link operably extends from the gearbox to a pivoting intermediate link. The intermediate link is pivotally supported by the main support arm and a second link operably extends from the intermediate link to operable engagement with the wiper arm. The links for actuating either wiper arm vary in length, form and respective attachment. Thus, a conventional windshield wiper system, designed as such, is over complicated and inefficient for production purposes.

Over the past several years, many manufacturers have implemented a "cab-forward" vehicle design including shallower sloping windshields. The shallower slope of the windshield reduces the space available for packaging windshield wiper systems. Thus, conventional windshield wiper systems, similar to that described above, limit the manufacturer's design capabilities. Therefore, it is desirable in the industry to provide a windshield wiper system that has improved packaging characteristics over traditional systems. Such an improved system should not only require less packaging space but should also comprise fewer components, thereby reducing overall manufacturing cost.

SUMMARY OF THE INVENTION

Accordingly, the present invention provides a wiper assembly comprising a wiper arm, an actuation mechanism operatively interconnected to the wiper arm, wherein the actuation mechanism includes a lever arm, a connecting rod pivotally connected to the lever arm at a first end, a crank pivotally connected to the connecting rod at a second end, a drive shaft having the crank fixedly attached thereto and a drive mechanism for rotatably driving the drive shaft. Rotation of the drive shaft induces reciprocal linear travel of the connecting arm for providing reciprocal angular motion of the wiper arm.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
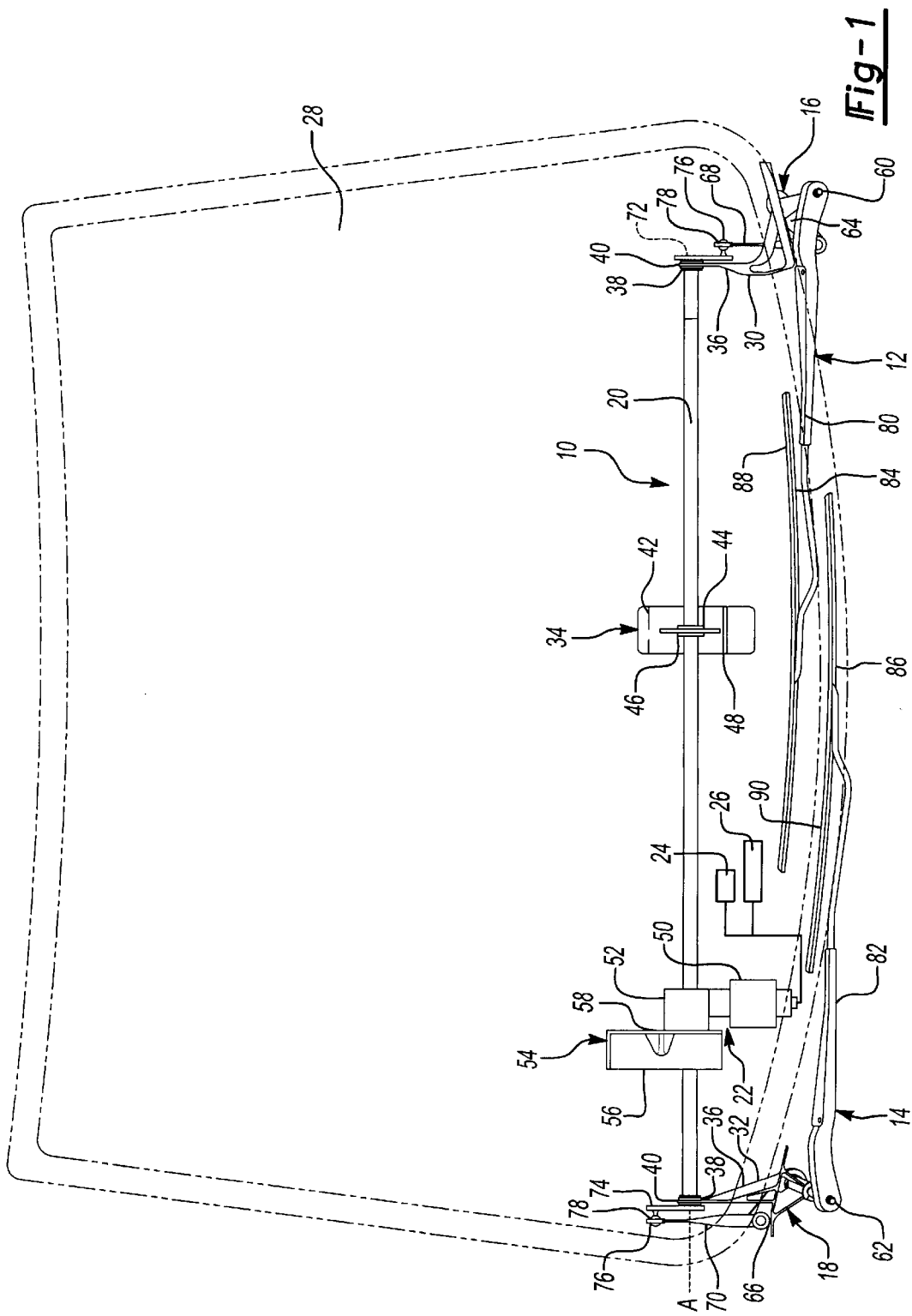
FIG. 1 is a schematic view of a vehicle wiper system in a rest position, according to the principles of the present invention.

The following description of the preferred embodiment(s) is merely exemplary in nature and is in no way intended to limit the invention, its application, or uses.

With particular reference to the Figures, a vehicle wiper system 10 will be described in detail. The vehicle wiper system 10 includes driver-side and passenger-side wiper assemblies 12, 14 operably interconnected with respective actuation assemblies 16, 18. The actuation assemblies 16, 18 are interconnected by a cross-vehicle shaft 20 that is rotatably driven by a drive assembly 22. The drive assembly 22 is in electrical communication with a power source 24 and a controller 26 for selectively actuating the drive assembly 22. Rotation of the cross-vehicle shaft 20 provides reciprocal, angular motion of the driver-side and passenger-side wiper assemblies 12, 14 through their respective actuation assemblies 16, 18. In this manner, the driver-side and passenger-side wiper assemblies 12, 14 travel across a windshield 28 for clearing water, dust and/or debris therefrom.

The cross-vehicle shaft 20 is rotatably supported between support brackets 30, 32 of the actuation assemblies 16, 18 respectively, and further supported by a mounting bracket 34 disposed intermediate the length of the cross-vehicle shaft 20. The brackets 30, 32 each include an arm 36 having an aperture 38 therethrough. A bearing or bushing 40 is fixedly disposed within the aperture 38 and receives an end of oral the cross-vehicle shaft 20 therethrough, for rotatably supporting the cross-vehicle shaft 20. The mounting bracket 34 includes a base 42 and an upward extending brace 44 having an aperture 46 therethrough. A bearing or bushing 48 is fixedly disposed within the aperture 46 and receives the cross-vehicle shaft 20 therethrough. The base 42 of the mounting bracket 34 is fixedly attached to a vehicle structure (not shown) for securing the cross-vehicle shaft 20.

The drive assembly 22 includes a motor 50 and a gearbox 52. The cross-vehicle shaft 20 is operably interconnected to an output of the gearbox 52. An output of the motor 50 is operably interconnected to the gearbox 52 for driving the gearbox 52, which in turn rotatably drives the cross-vehicle shaft 20. A mounting bracket 54 is provided and includes a base 56 and an upward extending brace 58. The base 56 is fixedly attached to a vehicle structure (not shown) and the gearbox 52 is fixedly attached to the brace 56 for securing the drive assembly 22. The power source 24 provides power for driving the motor 50 and the controller 26 controls the motor 50. It is foreseen that the controller 26 is able to control the motor 50 in various modes including, but not limited to, high, low, variable, intermittent and the like.

The driver-side and passenger-side actuation assemblies 16, 18 respectively include the brackets 30, 32, wiper posts 60, 62, lever arms 64, 66, connecting rods 68, 70 and cranks 72, 74. The wiper posts 60, 62 are received through and rotatably supported by the brackets 30, 32, having first ends extending upward as above the brackets 30, 32 and second ends extending downward below the brackets 30, 32. The first ends of the wiper posts 60, 62 are respectively fixed to the driver-side and passenger-side wiper assemblies 12, 14, and the second ends are fixedly attached to lever arms 64, 66. The lever arms 64, 66 extend radially outward from the wiper posts 60, 62 and are operably interconnected with the connecting rods 68, 70.

The connecting rods 68, 70 operably interconnect the lever arms 64, 66 and the cross-vehicle shaft 20. The cranks 72, 74 are disposed on either end of the cross-vehicle shaft 20 and extend radially outward. The cranks 72, 74 are radially offset from one another by 180° relative to an axis 'A' of the cross-vehicle shaft 20 and operably interconnect with the connecting rods 68, 70. The cranks 72, 74 and lever arms 64, 66 include ball mounts 76 disposed on their respective radial ends. The ball mounts 76 are received into sockets 78 of the connecting rods 68, 70, which are disposed through either end of the connecting rods 68, 70. In this manner, the connecting rods 68, 70 are pivotally interconnected to both the cranks 72, 74 and lever arms 64, 66. It should also be noted that the driver-side connecting rod 68 is shorter than the passenger-side connecting rod 70, thereby initially accelerating the driver-side wiper assembly 12 quicker than the passenger-side wiper assembly 14. In this manner, collision between the driver-side and passenger-side wiper assemblies 12,14 is avoided.

In operation, the wiper posts 60, 62 axially rotate, reciprocally, thereby providing reciprocal angular sweeping motion of the driver-side and passenger-side wiper assemblies 12, 14. As seen in FIG. 1, the driver-side and passenger-side wiper assemblies 12, 14 are in a rest position, whereby the crank 74, via the connecting rod 70, pulls the lever arm 66 to its uppermost point of angular rotation. Similarly, the crank 72, via the connecting rod 68, pushes the lever arm 64 to its lowest point of angular rotation. To initiate angular sweeping motion of the driver-side and passenger-side wiper assemblies 12, 14, the motor 50 drives rotation of the cross-vehicle shaft 20 through the gearbox 52, thereby rotating the cranks 72, 74. Rotation of the cranks 72, 74 drives linear reciprocal motion of the lever arms 64, 66.

Figure 2:
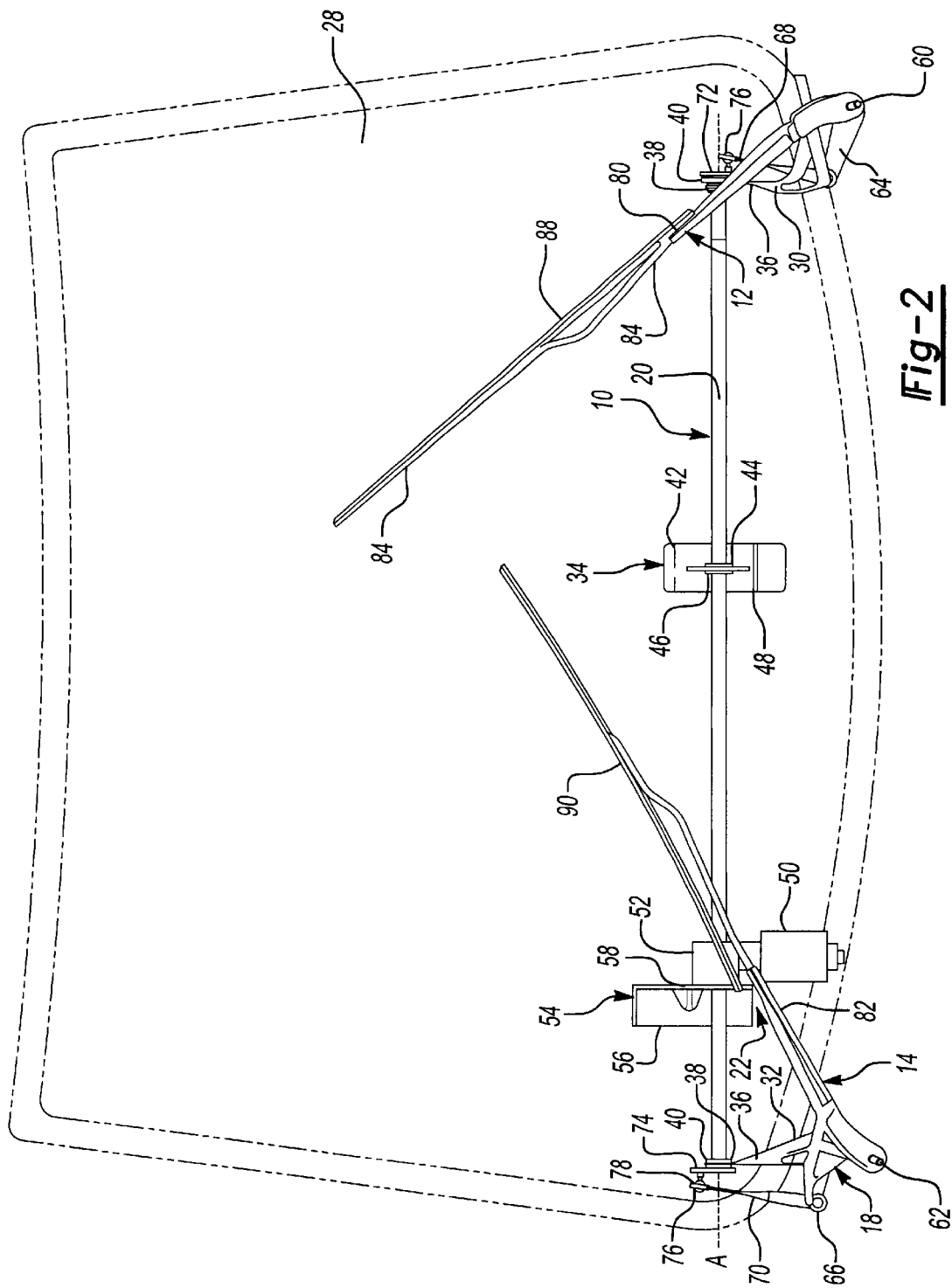
FIG. 2 is a schematic view of the vehicle wiper system in a mid-sweep position.
Figure 3:
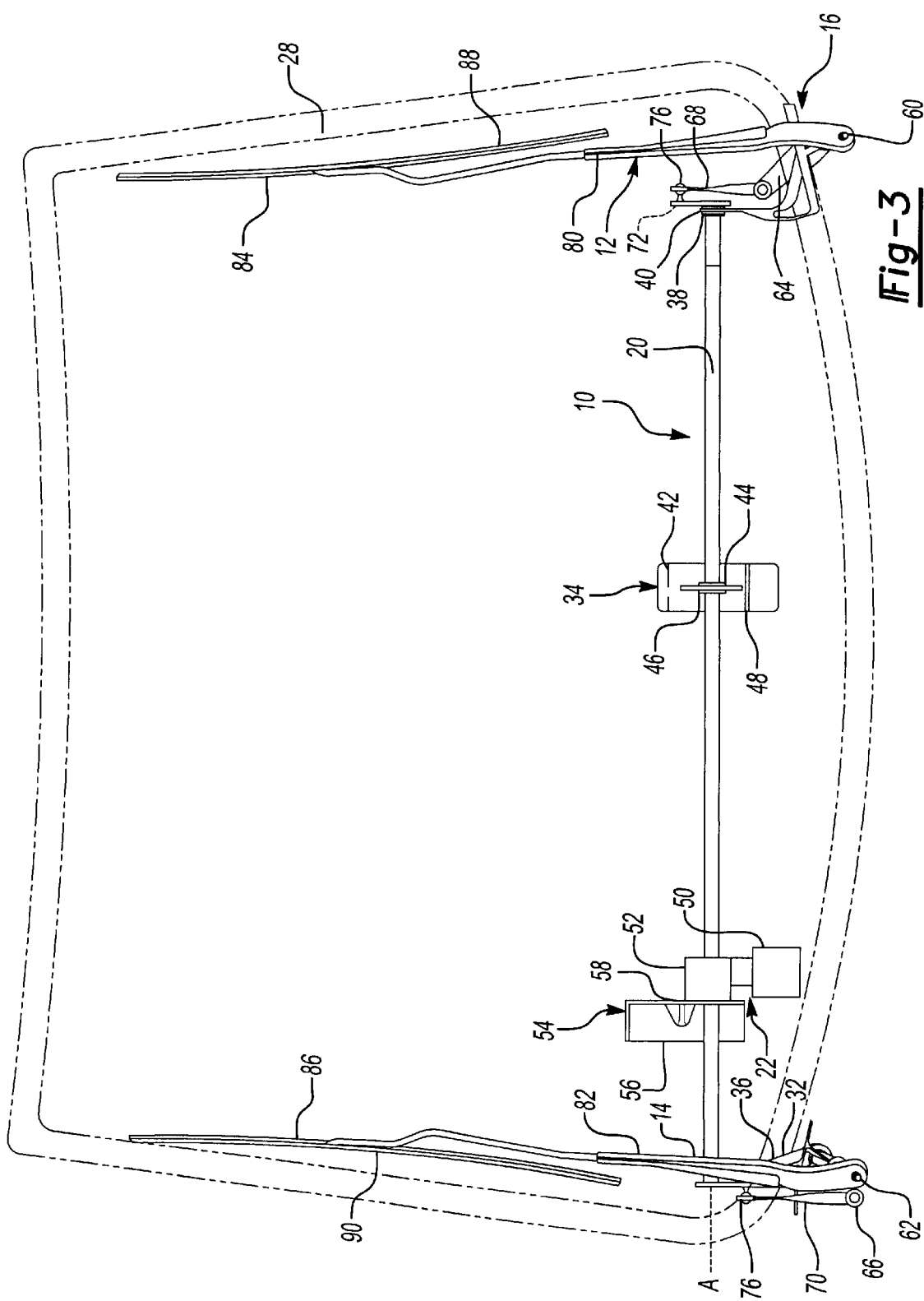
FIG. 3 is a schematic view of the vehicle wiper system in a maximum sweep position.
Figure 4:
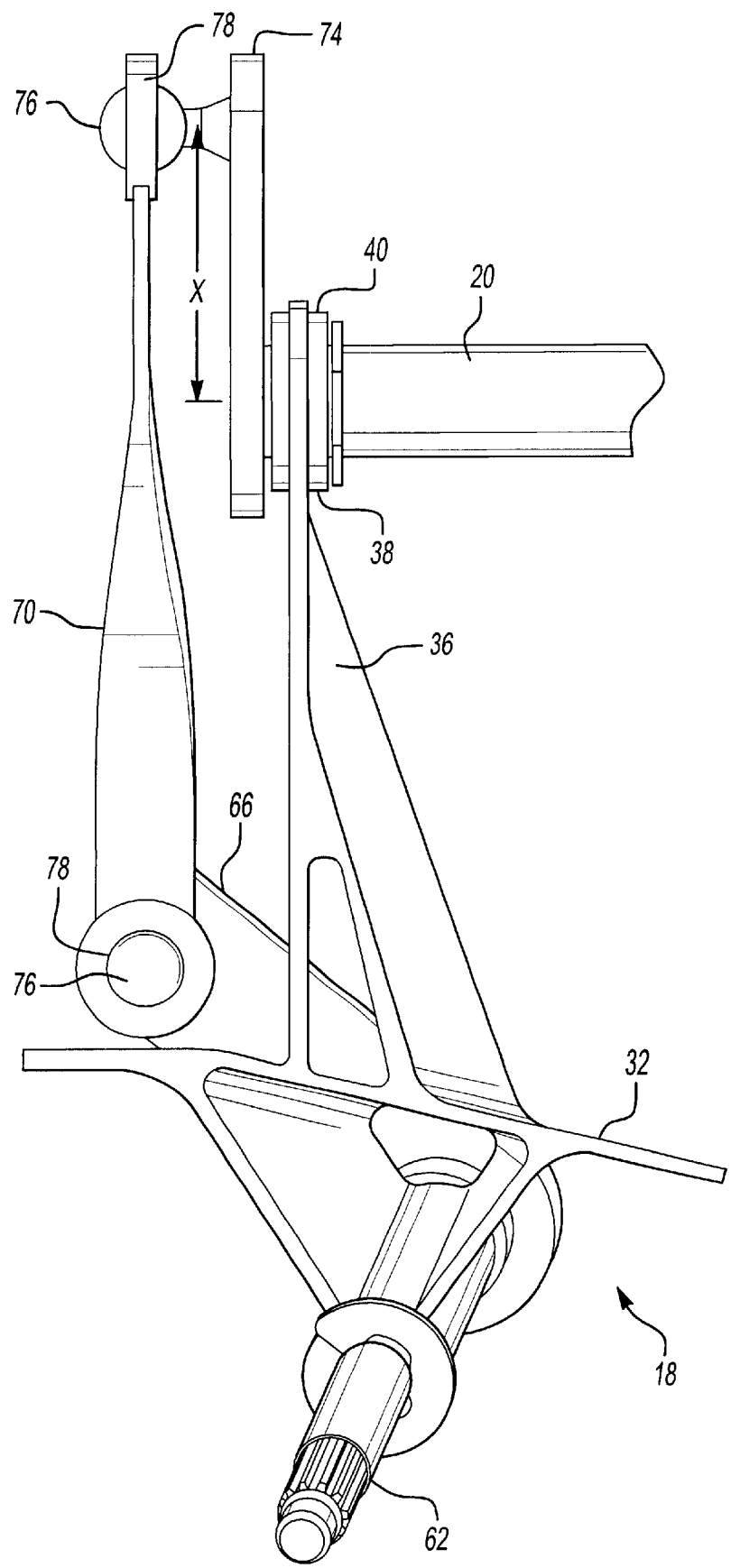
FIG. 4 is a detailed view of an actuation mechanism of the vehicle wiper system.

As shown in FIG. 2, the driver-side and passenger-side wiper assemblies 12, 14 are in a mid-sweep position, whereby the cross-vehicle shaft 20 has been partially rotated (between 45° and 90°). Concurrently, the crank 74 has rotated about the axis of the cross-vehicle shaft 20, pushing the lever arm 66 downward, thus causing the wiper post 62 and passenger-side wiper assembly 14 to pivot. Similarly, the crank 72 has rotated about the axis of the cross-vehicle shaft 20, pulling the lever arm 64 upward, thus causing the wiper post 60 and driver-side wiper assembly 12 to pivot. As the cross-vehicle shaft 20 rotates 180°, the driver-side and passenger-side wiper assemblies 12, 14 reach their maximum sweep positions. This is best seen in FIG. 3. In this position, the crank 74 pushes the lever arm 66 down to its lowest point of angular rotation, and the crank 72 pulls the lever arm 64 up to its uppermost point of angular rotation. As the cross-vehicle shaft 20 continues to rotate through 180° to 360°, the angular sweeping motion of the driver-side and passenger-side wiper assemblies 12,14 reciprocates and the driver-side and passenger-side wiper assemblies 12, 14 return to their rest positions.

The driver-side and passenger-side wiper assemblies 12, 14 respectively include wiper arms 80, 82 operably attached to the wiper posts 60, 62 at a first end. Wiper blades 84, 86 are attached to the wiper arms 80, 82 at a second end and include a rubber strip 88, 90 for providing a squeegee. The wiper arms 80, 82 are designed to press the squeegee of the wiper blades 80, 82 into contact with the windshield 28. As the driver-side and passenger-side wiper assemblies 12, 14 reciprocally sweep across the windshield 28, in the above-described manner, they wipe away water, dust, debris and the like.

The hereindescribed vehicle wiper system 10 achieves reciprocal sweeping motion of the wiper assemblies 12, 14 through a linkage system that is simplified over conventional vehicle wiper systems. In this manner, the vehicle packaging requirements for the vehicle wiper system 10 are minimized, enabling alternative vehicle design, such as shallower sloping windshields. Further, part quantity is reduced and manufacture is simplified, thereby reducing overall costs.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A windshield wiper system for use in a vehicle having a windshield, the system comprising:
   first and second wiper arms;
   first and second actuation mechanisms operably interconnected with each of said first and second wiper arms, said first and second actuation mechanisms each comprising:
      a lever arm;
      a crank;
      a connecting rod operably interconnecting said lever arm and said crank;
      a bracket operatively supporting said lever arm;
      a drive shaft having said cranks of said first and second actuation mechanisms fixedly attached at opposite ends thereof and rotatably supported between said brackets of said first and second actuation mechanisms;
      a drive mechanism for rotatably driving said drive shaft;
      wherein rotation of said drive shaft induces reciprocal linear travel of each said connecting arms for providing reciprocal angular motion of said first and second wiper arms; and
      wherein said crank of said first actuation mechanism is rotationally phased about an axis or said drive shaft relative to said crank of said second actuation mechanism.

2. A windshield wiper system for use in a vehicle having a windshield, the system comprising:
   first and second wiper arms;
   first and second actuation mechanisms operably interconnected with each of said first and second wiper arms, said first and second actuation mechanisms each comprising:
      a lever arm;
      a crank;
      a connecting rod operably interconnecting said lever arm and said crank;
      a bracket operatively supporting said lever arm;
      a drive shaft having said cranks of said first and second actuation mechanisms fixedly attached at opposite ends thereof and rotatably supported between said brackets of said first and second actuation mechanisms;
      a drive mechanism for rotatably driving said drive shaft;
      wherein rotation of said drive shaft induces reciprocal linear travel of each said connecting arms for providing reciprocal angular motion of said first and second wiper arms; and wherein a length of said connecting rod of said first actuation mechanism is unequal to a length of said connecting rod of said second actuation mechanism for providing different angular acceleration patterns of said first and second wiper arms.

* * * * *